United States Patent
Wu et al.

(10) Patent No.: US 9,912,598 B2
(45) Date of Patent: Mar. 6, 2018

(54) TECHNIQUES FOR DECREASING MULTIPROTOCOL LABEL SWITCHING ENTROPY LABEL OVERHEAD

(71) Applicant: CISCO TECHNOLOGY, INC., San Jose, CA (US)

(72) Inventors: Danmu Wu, Shanghai (CN); Jianda Liu, Shanghai (CN); Yunpeng Zhang, Shanghai (CN); Feng Cai, Shanghai (CN)

(73) Assignee: Cisco Technology, Inc., San Jose, CA (US)

( * ) Notice: Subject to any disclaimer, the term of this patent is extended or adjusted under 35 U.S.C. 154(b) by 44 days.

(21) Appl. No.: 15/184,840

(22) Filed: Jun. 16, 2016

(65) Prior Publication Data

US 2017/0366461 A1 Dec. 21, 2017

(51) Int. Cl.
*H04L 12/26* (2006.01)
*H04L 12/851* (2013.01)
*H04L 12/723* (2013.01)
*H04L 12/709* (2013.01)

(52) U.S. Cl.
CPC ............ *H04L 47/24* (2013.01); *H04L 45/245* (2013.01); *H04L 45/50* (2013.01)

(58) Field of Classification Search
None
See application file for complete search history.

(56) References Cited

U.S. PATENT DOCUMENTS

| | | | |
|---|---|---|---|
| 9,178,810 B1* | 11/2015 | Singh | H04L 45/50 |
| 9,369,380 B1* | 6/2016 | Singh | H04L 45/50 |
| 2015/0029849 A1 | 1/2015 | Frost et al. | |
| 2015/0131660 A1 | 5/2015 | Shepherd et al. | |
| 2015/0200843 A1 | 7/2015 | Frost et al. | |
| 2015/0222531 A1* | 8/2015 | Budhia | H04L 45/507 370/400 |
| 2016/0020941 A1 | 1/2016 | Asati et al. | |
| 2016/0285756 A1* | 9/2016 | Gafni | H04L 45/507 |

OTHER PUBLICATIONS

Kompella et al., "The Use of Entropy Labels in MPLS Forwarding", Nov. 2012, IETF, RFC 6790, All Pages.*
Kompella, K., et al., "The Use of Entropy Labels in MPLS Forwarding," Internet Engineering Task Force (IETF), RFC 6790, Nov. 2012, 25 pages; http://tools.ietf.org/html/rfc6790.

* cited by examiner

*Primary Examiner* — Otis L Thompson, Jr.

(57) ABSTRACT

A method is provided in one embodiment and includes receiving at a network element an encapsulated packet and determining whether both an ECMP/LAG Existing ("ele") flag and an Entropy Label Capability ("elc") flag are set for an egress node of the packet in a Label Distribution Protocol ("LDP") database of the network element. If both the ele and elc flags are set for the egress node of the packet in the LDP database, the method further includes determining whether the network element is an ingress node for the packet and, if the network element is the ingress node for the packet, pushing an Entropy Label ("EL") and an Entropy Label Indicator ("ELI") onto an MPLS stack of the packet.

20 Claims, 7 Drawing Sheets

TECHNIQUES FOR DECREASING MULTIPROTOCOL LABEL SWITCHING ENTROPY LABEL OVERHEAD

TECHNICAL FIELD

This disclosure relates in general to the field of communications networks and, more particularly, to techniques for decreasing Multiprotocol Label Switching ("MPLS") Entropy Label overhead in such communications networks.

BACKGROUND

Load balancing, or multi-pathing, is an attempt to balance traffic across a network by providing multiple paths for the traffic. Load balancing eases capacity planning, helps absorb traffic surges by dispersing the traffic across multiple paths, and allows better resilience by offering alternative paths in the event that a link or node fails. As providers scale their networks, they may use a variety of techniques to achieve greater bandwidth between nodes. Two commonly used techniques are Link Aggregation Group ("LAG") and Equal Cost Multi-Path ("ECMP"). LAG is used to bond together several physical circuits between two adjacent nodes so they appear to higher-layer protocols as a single, higher-bandwidth "virtual" pipe. ECMP is used between two nodes separated by one or more hops, to allow load balancing over several shortest paths in the network. This is typically accomplished by arranging IGP metrics such that there are several equal cost paths between source-destination pairs. LAG and ECMP may, and often do, coexist in differing parts of a provider's network.

It is important when performing load balancing to map packets belonging to the same flow to the same path. To meet this requirement, a node may use certain fields, or "keys", within a packet's header as input to a load balancing function that selects the path for all packets of the flow. For MPLS networks, finding useful keys in a packet for purposes of load balancing may be a challenge, as in many cases MPLS encapsulation may require a fairly deep inspection of packets to find these keys at transit nodes. One way to eliminate the need for deep packet inspection is to have the ingress node of an MPLS Label Switched Path extract the appropriate keys from a given packet, input them into its load balancing function, and then place the result in an "Entropy Label" ("EL") as part of the MPLS label stack it pushes onto the packet. The entire label stack of the MPLS packet can then be used by transit nodes to perform load balconing, as the EL introduces the right level of "entropy" into the label stack.

An MPLS EL is designed to act as a load balancing factor in an MPLS network, such as a service provider network. An ingress Provider Edge ("PE") node looks into traffic from a Customer Edge ("CE") node and then computes and pushes an EL together with an EL Indicator ("ELI") to each packet. The EL will be recognized and used by other provider routers for load balancing. A drawback to this technique is that the combination of EL and ELI adds eight bytes of overhead to every packet. When ECMP and/or LAG exists on the PE node to PE node path, the overhead is worthy and should be tolerated; however, when there is no ECMP or LAG on the PE node to PE node path, the overhead is a waste of bandwidth and CPU time.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one embodiment and includes receiving at a network element an encapsulated packet and determining whether both an ECMP/LAG Existing ("ele") flag and an Entropy Label Capability ("elc") flag are set for an egress node of the packet in a Label Distribution Protocol ("LDP") database of the network element. If both the ele and elc flags are set for the egress node of the packet in the LDP database, the method further includes determining whether the network element is an ingress node for the packet and, if the network element is the ingress node for the packet, pushing an Entropy Label ("EL") and an Entropy Label Indicator ("ELI") onto an MPLS stack of the packet. In some embodiments, the method may further include determining whether the MPLS stack of the packet includes the EL and the ELI if at least one of the ele flag and the elc flag is not set for the egress node of the packet in the LDP database and, if the MPLS stack of the packet includes the EL and the ELI, popping the EL and the ELI from the MPLS stack of the packet. The method may also include forwarding the packet to a next hop node.

In certain embodiments, if the egress node of the packet is not EL capable, the ele flag is not set for the egress node of the packet in the LDP database. Additionally, in certain embodiments, if the egress node of the packet is EL capable and Equal Cost Multi-Path ("ECMP") or Link Aggregation Group ("LAG") technology is deployed between the network element and a next hop node, the ele flag is set for the egress node of the packet in the LDP database. Still further, in some embodiments, if the egress node of the packet is EL capable and at least one of a plurality of next hops between the network element and the egress node of the packet has the ele flag set, the ele flag is set for the egress node of the packet in the LDP database. The network element may be a Multiprotocol Label Switching ("MPLS") router.

EXAMPLE EMBODIMENTS

Figure 1:
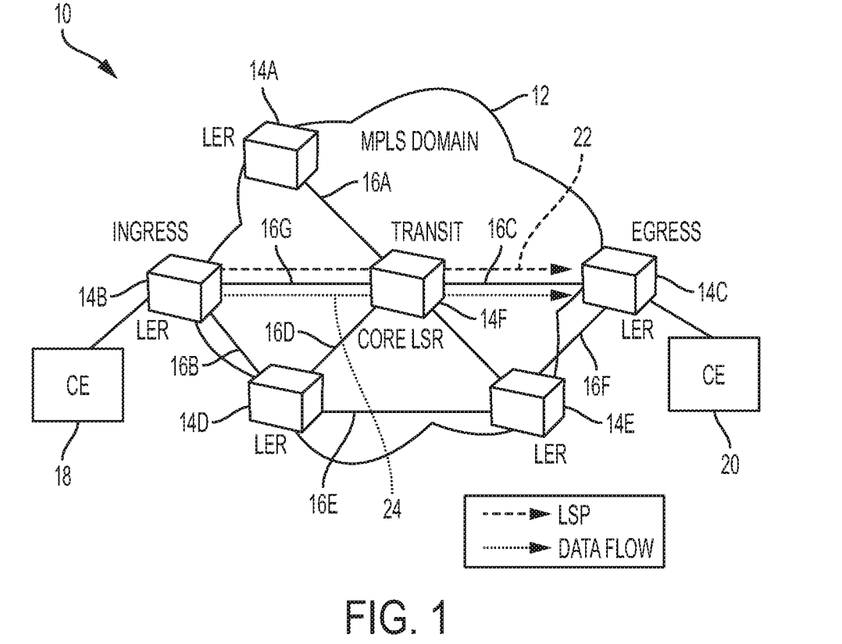
FIG. 1 is a simplified block diagram of a telecommunications network comprising an MPLS domain for implementing techniques for decreasing MPLS EL overhead in accordance with embodiments described herein.

Referring to FIG. 1, illustrated therein is a simplified block diagram of a telecommunications network 10 comprising an MPLS domain 12 for implementing techniques for decreasing MPLS EL overhead in accordance with embodiments described herein. As shown in FIG. 1, MPLS domain 12 includes a plurality of routers 14A-14F interconnected by links 16A-16G for carrying data between customer networks represented by Customer Edge ("CE") nodes 18, 20. In an MPLS domain, such as MPLS domain 12, data is directed from one network node to another based on short MPLS labels (as opposed to long network addresses), thereby avoiding complex routing table lookups. The MPLS labels identify virtual links, or paths, between nodes rather than endpoints. MPLS can encapsulate packets of a variety of network protocols and supports a range of access technologies. MPLS operates by adding to packets an MPLS header containing one or more labels, referred to as a "label stack."

MPLS-labeled packets are switched after a label lookup (as opposed to an address lookup). An MPLS router that performs routing based on label lookup is referred to as a Label Switch Router ("LSR") or transit router. LSRs are located in the middle of an MPLS network and are responsible for switching the labels used to route packets. Referring to FIG. 1, router 14F is a transit router or LSR. When an LSR receives a packet, it uses the label in the packet header as an index to determine the next hop on the label-switched path ("LSP") and a corresponding label for the packet from a lookup table. The old label is removed from the header and replaced with the label from the lookup table before the packet is routed forward.

A Label Edge Router ("LER") is a router that operates on the edge of an MPLS network and functions as the entry/exit point of the network. Referring again to FIG. 1, routers 14A-14D are LERs. LERs push an MPLS label onto an incoming packet and pop an MPLS label off of an outgoing packet. Alternatively, penultimate hop popping may be performed, in which case the LSR directly connected to the LER pops the MPLS label off the packet. As an ingress LER for an IP packet, the LER uses routing information to determine appropriate MPLS labels to be affixed to the packet, labels the packet, and then forwards the labeled packet into the MPLS domain. Similarly, as an egress LER for a packet, the LER strips (or "pops") the MPLS label off of the packet and forwards the resulting IP packet using normal IP forwarding rules. Referring to FIG. 1, router 14B is an ingress LER, while router 14C is an egress router.

In the context of an MPLS-based Virtual Private Network ("VPN"), an LER that functions as an ingress and/or egress router to the VPN may be referred to as a Provider Edge ("PE") router. Devices that function only as transit routers in the VPN are referred to simply as Provider ("P") routers. Labels are distributed between LERs and LSRs using Label Distribution Protocol ("LDP"). LSRs in an MPLS network regularly exchange label and reachability information with each other using standardized procedures in order to build a complete picture of the network that may be used to forward packets. Label Switched Paths ("LSPs") are established by a network operator for a variety of purposes, such as to create network-based IP virtual private networks or to route traffic along specified paths through the network.

When an unlabeled packet enters the MPLS domain (e.g., from CE node 18), the ingress LER first determines Forwarding Equivalence Class ("FEC") for the packet and adds the MPLS label stack to the packet. The packet is then passed on to the next hop router of the tunnel. When a labeled packet is received by an MPLS router, the topmost label is examined. Based on the contents of the label a "swap," "push" ("impose"), or "pop" ("dispose") operation is performed on the packet's label stack. Routers may include lookup tables that dictate which kind of operation to do based on the topmost label of the stack to facilitate packet processing. In a swap operation, the label is replaced with a new label and the packet is forwarded along the path associated with the new label. In a push operation, a new label is pushed onto the top of the stack. In a pop operation, the label is removed from the packet, which may expose a label below. This process may be referred to as "decapsulation". If the popped label was the last label on the stack, the packet exits the MPLS tunnel. During these operations, the contents of the packet below the MPLS Label stack are not examined. Indeed, transit routers typically need only to examine the topmost label on the stack. The forwarding of the packet is done based on the contents of the labels, which allows "protocol-independent packet forwarding" that does not need to look at a protocol-dependent routing table and avoids the expensive IP longest prefix match at each hop.

A label switched path ("LSP"), or MPLS tunnel, is a path through an MPLS network established by a signaling protocol (e.g., LDP, RSVP-TE, BGP, CR-LDP, etc.). In FIG. 1, an LSP is designated by reference numeral 22. The path is established based on criteria in the FEC. The LSP begins at an LER, which determines which label to push to a packet, based on the corresponding FEC. The LER then forwards the packet to the next router along the LSP, which swaps the packets outer label for another label and forwards it to the next router. The last router in the path removes the label from the packet and forwards the packet based on the header of its next layer (e.g., to CE node 20). As previously noted, the router that first pushes an MPLS header to a packet is referred to as the ingress router. The last router in the LSP (which typically pops the label from the packet), is referred to as the egress router. Intermediate routers, which only need to swap labels, are referred to as transit routers or LSRs.

It will be noted that LSPs are unidirectional; in other words, they enable a packet to be label switched through the MPLS network from an ingress LER to an egress LER, as illustrated by an arrow 24 corresponding to data flow for the LSP 22. Since bidirectional communication is typically desired, the aforementioned dynamic signaling protocols may be used to establish an LSP in the other direction to effectively provide bidirectionality.

An EL is a label (1) that is not used for forwarding; (2) that is not signaled; and (3) the only purpose of which in the label stack is to provide "entropy" to improve load balancing. ELs are generated by an ingress LSR based entirely on load-balancing information. Since entropy labels are generated by an ingress LSR, an egress LSR must be able to distinguish unambiguously between entropy labels and application labels. To accomplish this, the label immediately preceding (i.e., closer to the top of the label stack than) an EL in the MPLS stack is an ELI. As previously noted, the combination of EL and ELI adds 8 bytes of overhead to every MPLS packet, which may be worthy in some instances (e.g., when ECMP or LAG exists on the PE node to PE node path) and not in others (e.g., when neither ECMP nor LAG exists on the PE node to PE node path. If the ingress PE always adds ELI/EL into MPLS stack even when there is no ECMP or LAG on the PE node to PE node path, ELI/EL are useless but consume the resources of each router on the processing path. In accordance with features of embodiments described herein, EL is calculated, thereby negatively affecting the performance of the ingress router. Even in cases involving a PE node to PE node path with ECMP or LAG, the last few hops before the egress PE may not have ECMP or LAG. For those hops without ECMP or LAG, carrying EL/ELI is a waste of bandwidth.

Another performance consideration is Ultimate Hop Popping ("UHP") vs. Penultimate Hop Popping ("PHP"). If UHP is performed for EL/ELI, there will be one extra forwarding table lookup against ELI on the egress PE node. PHP can omit this lookup and improve performance, but according to IETF RFC 6790 entitled "The Use of Entropy Labels in MPLS Forwarding" (hereinafter "RFC 6790"), it must be ensured that doing so (i.e., omitting the lookup) "doesn't diminish its ability to load balance on the next hop." Because there is no clear signal whether there's ECMP or LAG between a penultimate hop P router and an egress PE router, UHP is always implemented for EL/ELI.

In accordance with features of embodiments described herein, ELI/EL are added into MPLS stack only if they're needed, i.e., when there are ECMPs or LAGs between the ingress PE node and the egress PE node, and will not be added for a PE node to PE node path that does not have ECMP or LAG. Alternatively, ELI/EL may be popped in a mid-way provider router when we know there will be no more ECMP/LAG on the following hops of the path. Performance and throughput between nodes in the network will be improved by the following aspects. First, the ingress PE node doesn't need to perform deep packet inspection for customer edge traffic and calculate ELs when there is no ECMP or LAG. Additionally, provider routers will not need to waste bandwidth to transfer ELI/EL. Finally, egress PE nodes will not need to perform extra forwarding table lookup for ELI.

In one embodiment, to identify whether ELI/EL need to be added to the MPLS stack of traffic, a new flag, referred to herein as "ECMP/LAG Existing" ("ele") is introduced in the EL signaling protocols (e.g., LDP, BGP, etc.) to indicate the existence of ECMP or LAG on a hop. Using an LDP-signaled EL case as an example, the ele flag will be set in the LDP database and message only if (1) the router has ECMP or LAG to reach the prefix, which means load balance exists for the prefix on the local router; or (2) the next hop, or one of the next hops, to the prefix has set the ele flag in the LDP message.

As same as the Entropy Label Capability ("elc") flag described in detail in RFC 6790, if a router understands the ele flag, it must maintain it in its database and send it to its neighbors via LDP messages. Two forwarding rules are employed in connection with the ele flag. First, the ingress PE node will calculate and add ELI/EL only when both elc and ele flags are set; a single flag set will not trigger EL processing. Second, none of the elc rules defined in the RFC 6790 will be broken, so all ECMP next hops that set the elc flag can be used to load balance the traffic. However, if a router observes that one of its LDP neighbors doesn't set the ele flag, it should remove ELI/EL from the packets it sends to this neighbor because the absence of the ele flag means that there is only one path from this neighbor to the destination. For those neighbors that set the ele flag, the ELI/EL is maintained as usual because the information is needed for some routers along the paths to perform load balancing.

Figure 2:
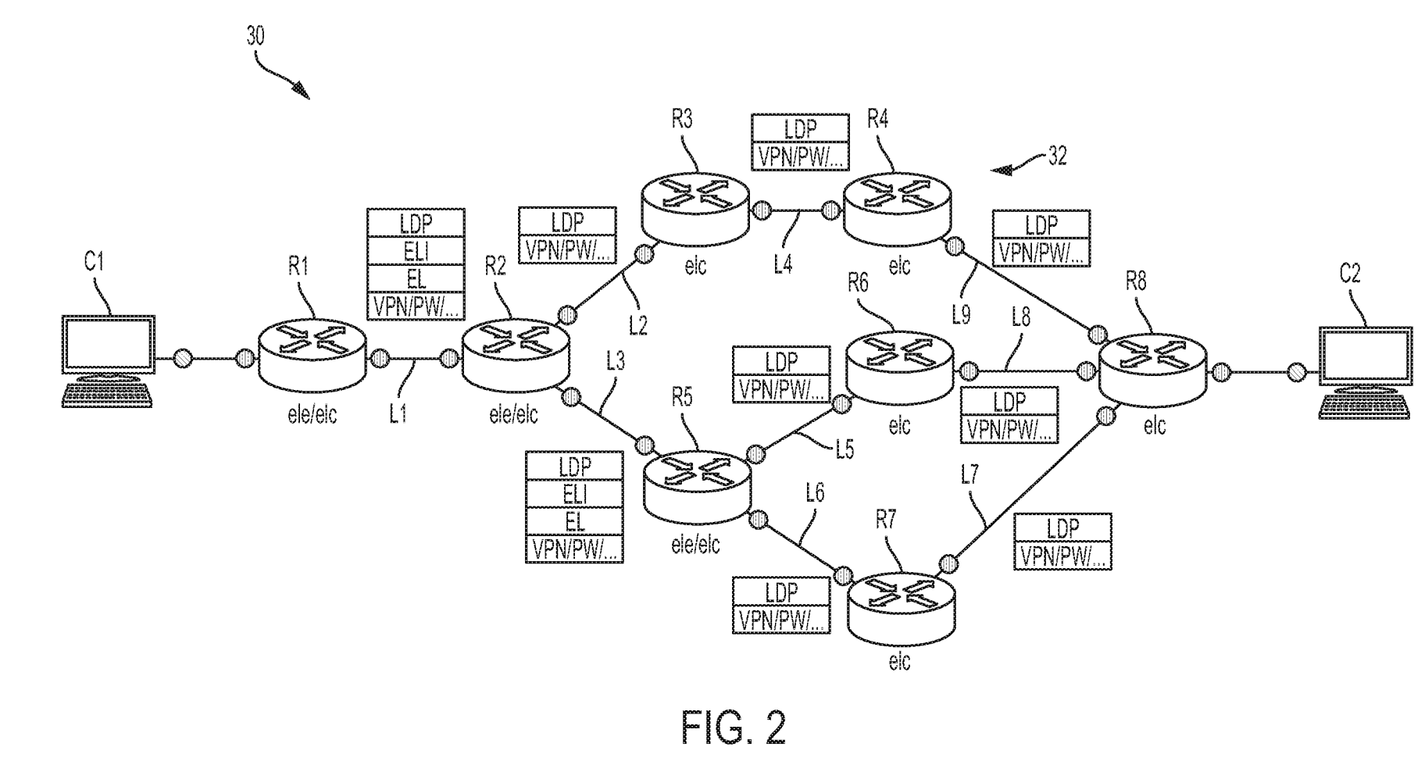
FIG. 2 illustrates a simplified block diagram of another telecommunications network comprising an MPLS domain for implementing techniques for decreasing MPLS EL overhead in accordance with embodiments described herein.

FIG. 2 illustrates a simplified block diagram of a telecommunications network 30 comprising an MPLS domain 32 for implementing techniques for decreasing MPLS EL overhead in accordance with embodiments described herein. As shown in FIG. 2, the MPLS domain 32 interconnects customer equipment C1 with customer equipment C2 and includes a plurality nodes, or routers, R1-R8, interconnected by links L1-L9. Assuming for the sake of example that router R1 is the ingress PE node and router R8 is the egress PE and that router R8 supports Entropy Label so that it sets the elc flag in all of its prefixes, the other routers R1-R7 will set the elc flag against router R8's prefixes in LDP messages, as is typical. Router R5 will set the ele flag for router R8's prefixes because router R5 has ECMP to router R8. Router R2 will set the ele flag as well because it receives an LDP message 34 from router R5 that sets the ele flag for router R8. It should be noted that router R2 has two ECMPs to R8, so without seeing the ele flag from router R5, router R2 will also set the ele flag. Router R1 sets the ele flag because the LDP message 36 from router R2 contains the ele flag for router R8. Router R1 adds ELI/EL into traffic with a destination of router R8. Router R2 uses ELI/EL to load balance traffic to router R3 and router R5. When traffic is sent to router R3, it removes the ELI/EL from all packets. ELI/EL will be kept for those packets sent to router R5. As a result, routers R3 and R4 won't waste bandwidth on transferring ELI/EL. Router R5 also uses ELI/EL to perform load balancing and removes ELI/EL in all packets before forwarding the traffic to routers R6 and R7. Router R8 does not need to perform a lookup in its MPLS forwarding table for ELI.

Figure 3:
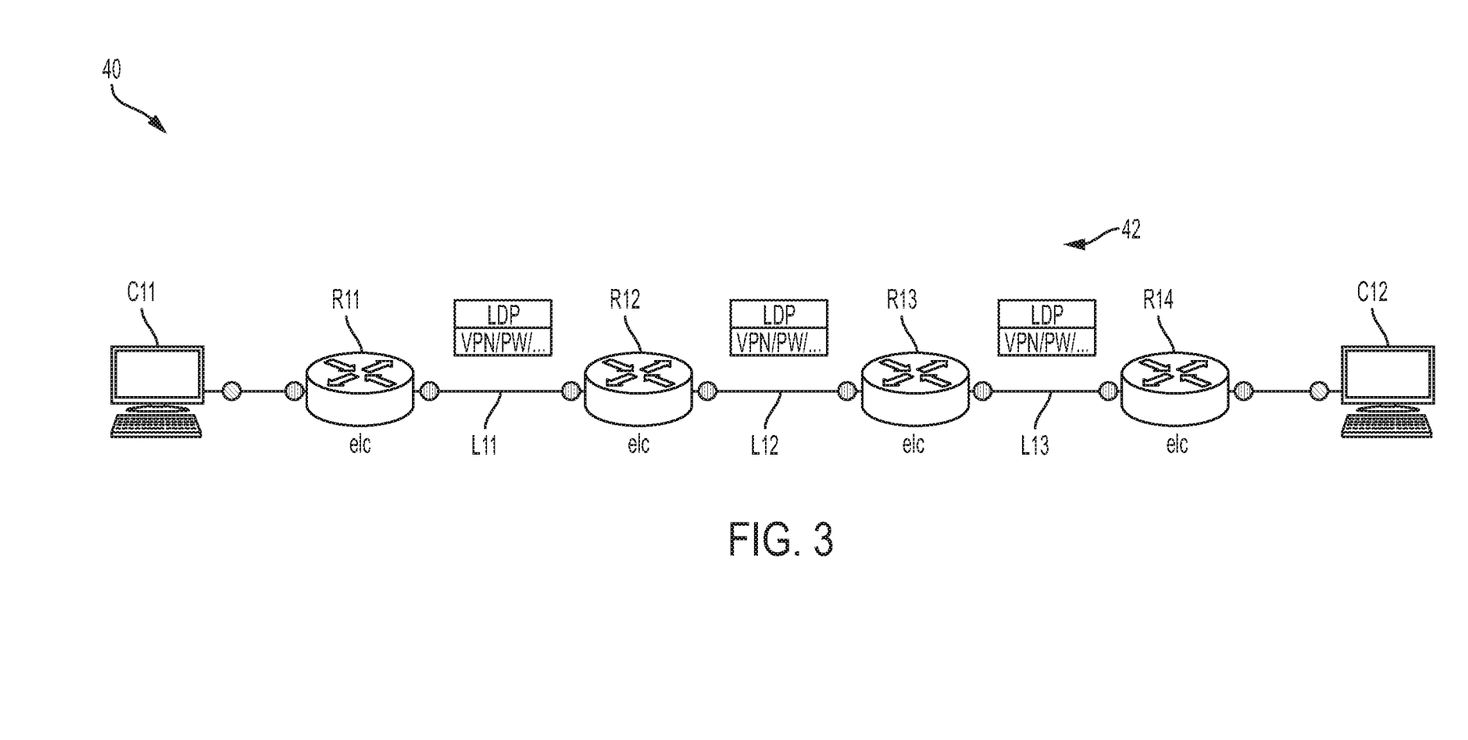
FIG. 3 illustrates a simplified block diagram of yet another telecommunications network comprising an MPLS domain for implementing techniques for decreasing MPLS EL overhead in accordance with embodiments described herein.

FIG. 3 illustrates a simplified block diagram of a telecommunications network 40 comprising an MPLS domain 42 for implementing techniques for decreasing MPLS EL overhead in accordance with embodiments described herein. As shown in FIG. 3, the MPLS domain 42 interconnects customer equipment C11 with customer equipment C12 and includes a plurality nodes, or routers, R11-R14, interconnected by links L11-L13. Assuming for the sake of example that router R11 is the ingress PE node and router R14 is the egress PE and that (as illustrated in FIG. 3 there is only one path between the ingress PE and the egress PE, router R14 will set the elc flag to all of its prefixes, as it supports EL. Routers R11, R12, and R13 learn the elc flag of R14's prefixes by LDP messages 44, 46, and 48, respectively. Because none of the routers R11-R13 has ECMPs to router R14, none of the routers sets the ele flag to router R14's prefixes. Router R11 won't add ELI/EL into traffic toward router R14 as none of the routers along the path (i.e., routers R12 and R13) are able to load balance the traffic from router R11 to router R14. Router R11 saves a lot of time and resources by not having to pick up information from CE traffic, calculate the EL number, and insert ELI/EL onto the MPLS label stack. Additionally, routers R12-R14 don't need to waste time and resources going through the ELI/EL process; instead, they only perform a lookup from the MPLS forwarding table and swap/pop the label(s).

Figure 4:
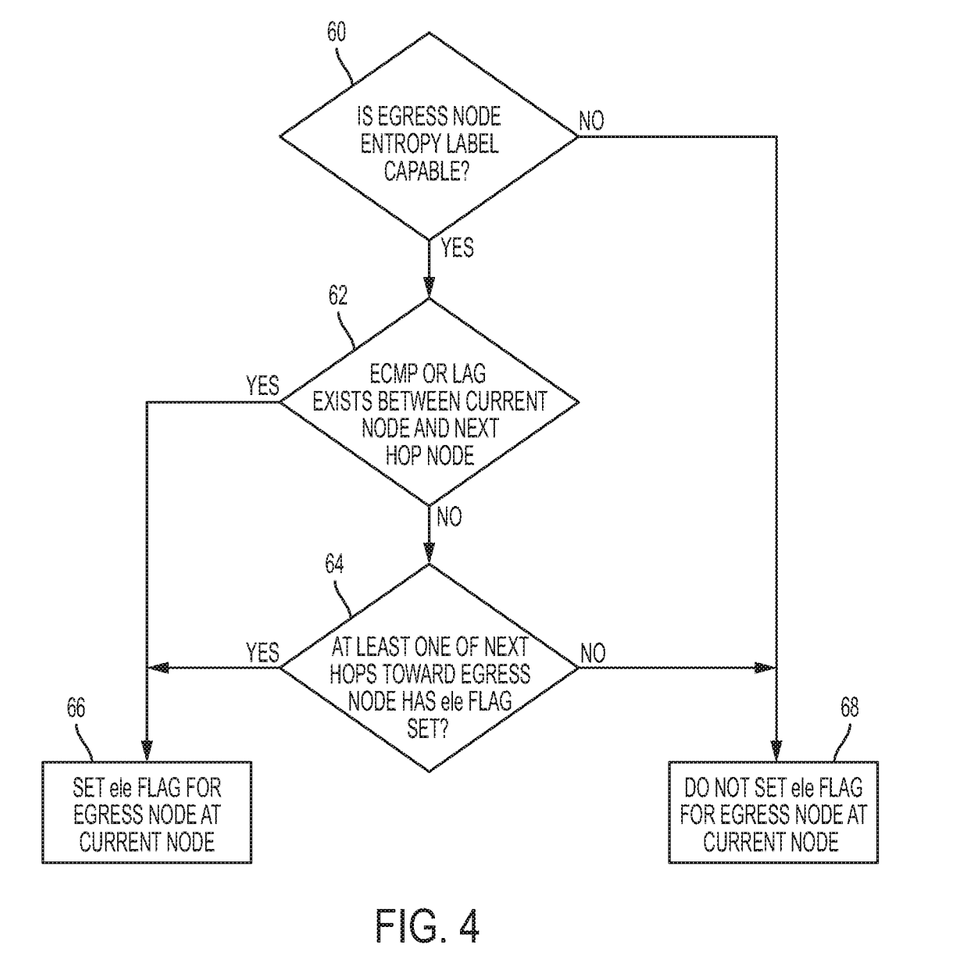
FIG. 4 is a flowchart illustrating example operations that may be performed by a node of the MPLS network for implementing techniques for decreasing MPLS EL overhead in accordance with embodiments described herein.

FIG. 4 is a flowchart illustrating example operations performed by an MPLS node, or router, for implementing techniques for decreasing MPLS EL overhead in accordance with embodiments described herein. Referring to FIG. 4, in step 60, a determination is made whether the egress node is EL capable. This may be performed by determining whether the destination node has advertised that it is elc (e.g., in an LDP message). If a positive determination is made in step 60, execution proceeds to step 62, in which a determination is made whether ECMP or LAG exists between the current node and the next hop node. IF a negative determination is made in step 62, execution proceeds to step 64, in which a determination is made whether at least one of the next hops toward the egress node has the ele flag set. If a positive determination is made in step 64, execution proceeds to step 66, in which the ele flag for the egress node is set in the LDP database and message at the current node. Similarly, if a positive decision is made in step 60, execution proceeds to step 66. If a negative determination is made in either step 60 or step 66, execution proceeds to step 68, in which the ele flag is not set for the egress node in the LDP database or message at the current node.

Figure 5:
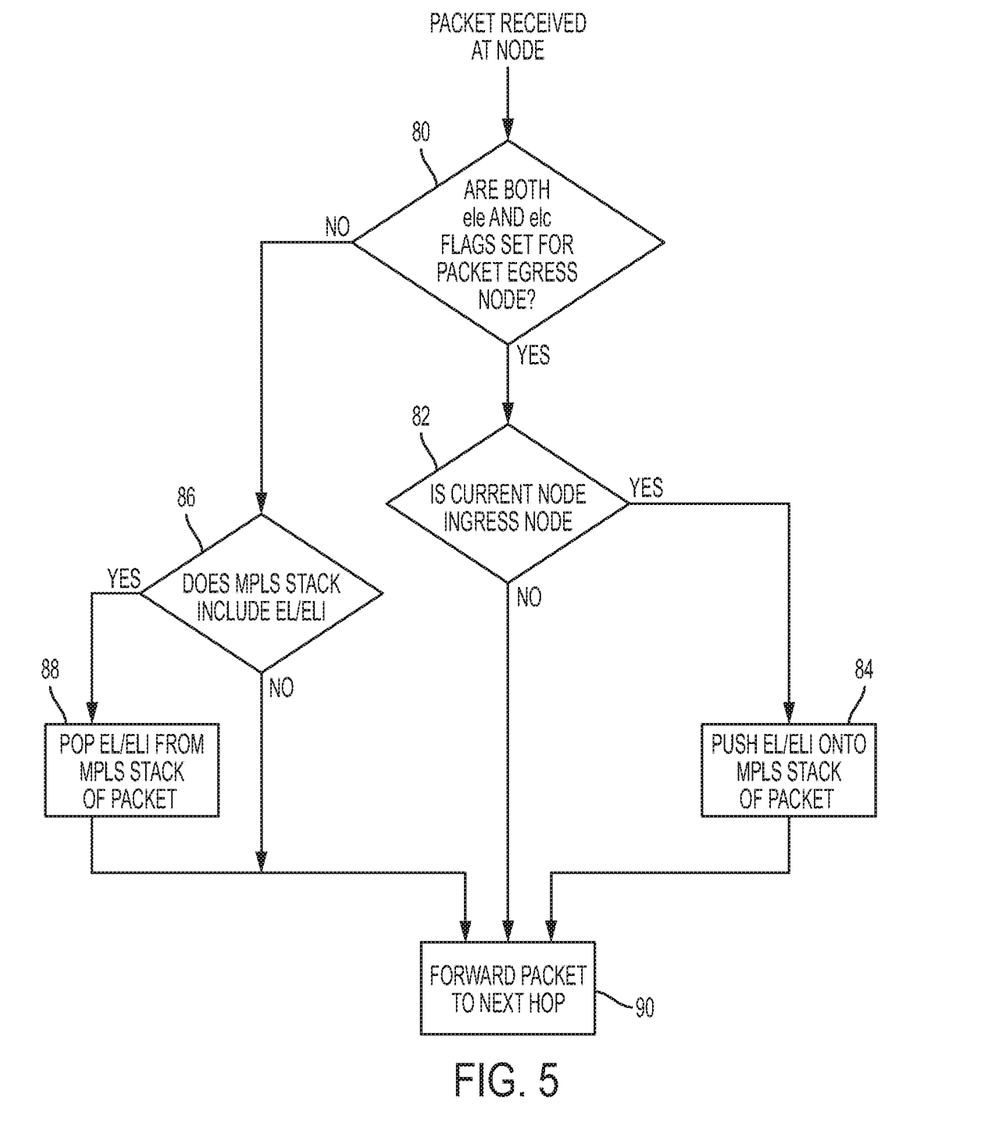
FIG. 5 is a flowchart illustrating additional example operations that may be performed by a node of the MPLS network for implementing techniques for decreasing MPLS EL overhead in accordance with embodiments described herein.

FIG. 5 is a flowchart illustrating example operations performed by an MPLS node, or router, for implementing techniques for decreasing MPLS EL overhead in accordance with embodiments described herein upon receipt of a packet. Referring to FIG. 5, in step 80, a determination is made whether both ele and elc flags are set for the egress node of the received packet. If a positive determination is made in step 80, execution proceeds to step 82, in which a determination is made whether the current node is the ingress node for the received packet. If a positive determination is made in step 82, execution proceeds to step 84, in which the EL and ELI are pushed onto the MPLS stack of the packet.

If a negative determination is made in step 80, execution proceeds to step 86, in which a determination is made whether the MPLS stack already includes an EL and an ELI. If so, execution proceeds to step 88, in which the EL/ELI are popped off the MPLS stack (since it has already been determined that they are not needed). Upon completion of any of steps 82, 84, and 88, the packet is forwarded to the next hop.

In example implementations, at least some portions of the activities related to the techniques described herein may be implemented in software in, for example, a server, a router, etc. In some embodiments, this software could be received or downloaded from a web server, provided on computer-readable media, or configured by a manufacturer of a particular element in order to provide this system in accordance with features of embodiments described herein. In some embodiments, one or more of these features may be implemented in hardware, provided external to these elements, or consolidated in any appropriate manner to achieve the intended functionality.

Figure 6:
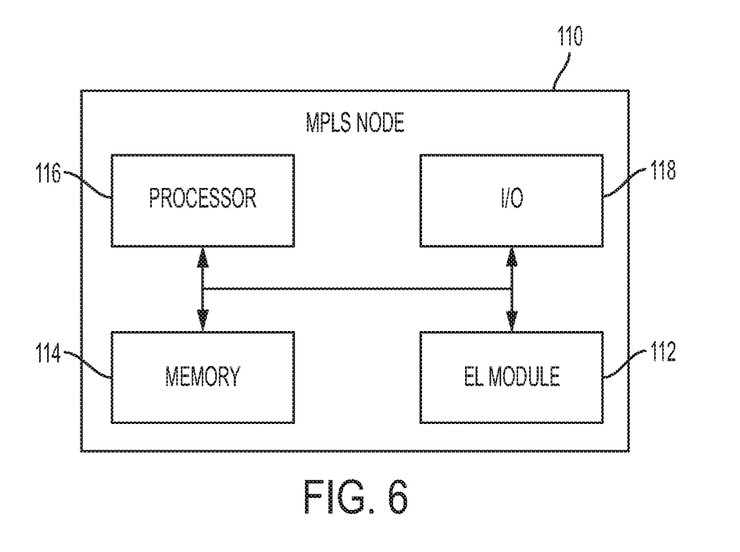
FIG. 6 is a simplified block diagram of an MPLS node configured for implementing techniques for decreasing MPLS EL overhead in accordance with embodiments described herein.

For example, referring to FIG. 6, an MPLS node 110, which may be implemented as an LSR, may include an EL module 112 comprising software embodied in one or more tangible media for facilitating the activities described herein. In particular, the EL module 112 may comprise software for facilitating the processes illustrated in and described with reference to FIGS. 4 and 5. The node 110 may also include a memory device 114 for storing information to be used in achieving the functions as outlined herein. Additionally, the node 110 may include a processor 116 that is capable of executing software or an algorithm (such as embodied in module 112) to perform the functions as discussed in this Specification. The node 110 may also include various I/O 118 necessary for performing functions described herein.

Figure 7:
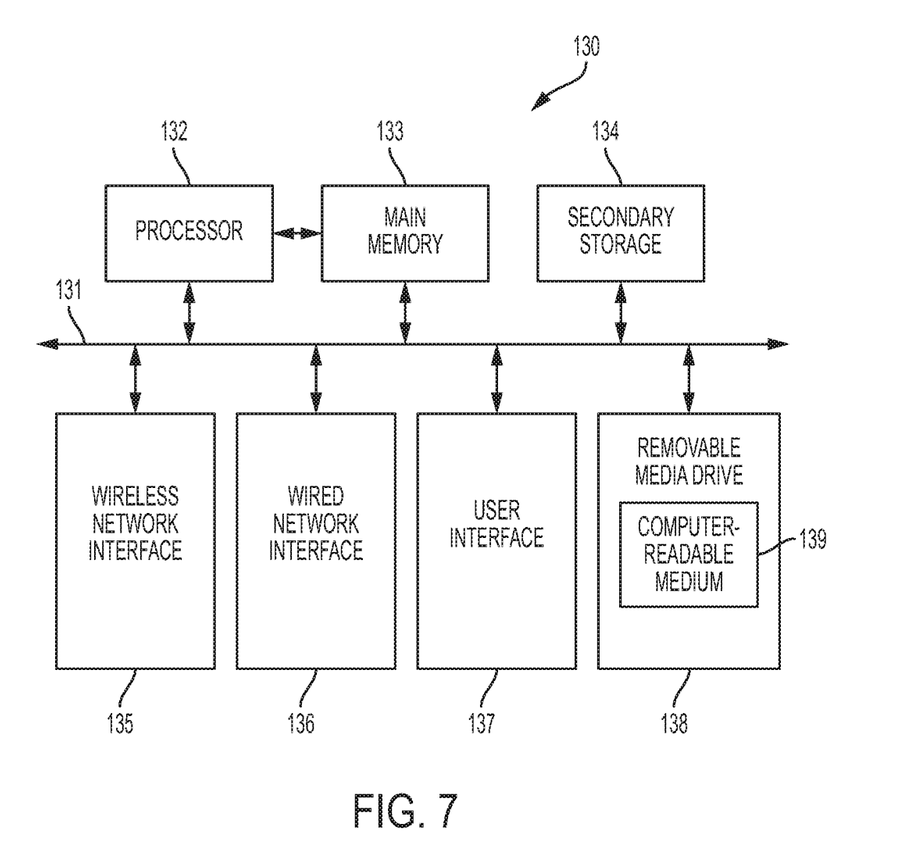
FIG. 7 is a simplified block diagram of a machine comprising an element of a communications network in which techniques for infrastructure-exclusive service forwarding in accordance with embodiments described herein may be implemented.

Turning now to FIG. 7, illustrated therein is a simplified block diagram of an example machine (or apparatus) 130, which in certain embodiments may be a classifier or a forwarding element, that may be implemented in embodiments described herein. The example machine 130 corresponds to network elements and computing devices that may be deployed in a communications network, such as a classifier or a forwarding element. In particular, FIG. 7 illustrates a block diagram representation of an example form of a machine within which software and hardware cause machine 130 to perform any one or more of the activities or operations discussed herein. As shown in FIG. 7, machine 130 may include a processor 132, a main memory 133, secondary storage 134, a wireless network interface 135, a wired network interface 136, a user interface 137, and a removable media drive 138 including a computer-readable medium 139. A bus 131, such as a system bus and a memory bus, may provide electronic communication between processor 132 and the memory, drives, interfaces, and other components of machine 130.

Processor 132, which may also be referred to as a central processing unit ("CPU"), can include any general or special-purpose processor capable of executing machine readable instructions and performing operations on data as instructed by the machine readable instructions. Main memory 133 may be directly accessible to processor 132 for accessing machine instructions and may be in the form of random access memory ("RAM") or any type of dynamic storage (e.g., dynamic random access memory ("DRAM")). Secondary storage 134 can be any non-volatile memory such as a hard disk, which is capable of storing electronic data including executable software files. Externally stored electronic data may be provided to computer 130 through one or more removable media drives 138, which may be configured to receive any type of external media such as compact discs ("CDs"), digital video discs ("DVDs"), flash drives, external hard drives, etc.

Wireless and wired network interfaces 135 and 136 can be provided to enable electronic communication between machine 130 and other machines, or nodes. In one example, wireless network interface 135 could include a wireless network controller ("WNIC") with suitable transmitting and receiving components, such as transceivers, for wirelessly communicating within a network. Wired network interface 136 can enable machine 130 to physically connect to a network by a wire line such as an Ethernet cable. Both wireless and wired network interfaces 135 and 136 may be configured to facilitate communications using suitable communication protocols such as, for example, Internet Protocol Suite ("TCP/IP"). Machine 130 is shown with both wireless and wired network interfaces 135 and 136 for illustrative purposes only. While one or more wireless and hardwire interfaces may be provided in machine 130, or externally connected to machine 130, only one connection option is needed to enable connection of machine 130 to a network.

A user interface 137 may be provided in some machines to allow a user to interact with the machine 130. User interface 137 could include a display device such as a graphical display device (e.g., plasma display panel ("PDP"), a liquid crystal display ("LCD"), a cathode ray tube ("CRT"), etc.). In addition, any appropriate input mechanism may also be included such as a keyboard, a touch screen, a mouse, a trackball, voice recognition, touch pad, etc.

Removable media drive 138 represents a drive configured to receive any type of external computer-readable media (e.g., computer-readable medium 139). Instructions embodying the activities or functions described herein may be stored on one or more external computer-readable media. Additionally, such instructions may also, or alternatively, reside at least partially within a memory element (e.g., in main memory 133 or cache memory of processor 132) of machine 130 during execution, or within a non-volatile memory element (e.g., secondary storage 134) of machine 130. Accordingly, other memory elements of machine 130 also constitute computer-readable media. Thus, "computer-readable medium" is meant to include any medium that is capable of storing instructions for execution by machine 130 that cause the machine to perform any one or more of the activities disclosed herein.

Not shown in FIG. 7 is additional hardware that may be suitably coupled to processor 132 and other components in the form of memory management units ("MMU"), additional symmetric multiprocessing ("SMP") elements, physical memory, peripheral component interconnect ("PCI") bus and corresponding bridges, small computer system interface ("SCSI")/integrated drive electronics ("IDE") elements, etc. Machine 130 may include any additional suitable hardware, software, components, modules, interfaces, or objects that facilitate the operations thereof. This may be inclusive of appropriate algorithms and communication protocols that allow for the effective protection and communication of data. Furthermore, any suitable operating system may also be configured in machine 130 to appropriately manage the operation of the hardware components therein.

The elements, shown and/or described with reference to machine 130, are intended for illustrative purposes and are not meant to imply architectural limitations of machines such as those utilized in accordance with the present disclosure. In addition, each machine may include more or fewer components where appropriate and based on particular needs. As used herein in this Specification, the term "machine" is meant to encompass any computing device or network element such as servers, routers, personal computers, client computers, network appliances, switches, bridges, gateways, processors, load balancers, wireless LAN controllers, firewalls, or any other suitable device, component, element, or object operable to affect or process electronic information in a network environment.

In example implementations, at least some portions of the activities described herein may be implemented in software in. In some embodiments, this software could be received or downloaded from a web server, provided on computer-readable media, or configured by a manufacturer of a particular element in order to implement the embodiments described herein. In some embodiments, one or more of these features may be implemented in hardware, provided external to these elements, or consolidated in any appropriate manner to achieve the intended functionality.

In one example implementation, classifier and forwarding elements, which may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

Furthermore, in the embodiments described and illustrated herein, some of the processors and memory elements associated with the various network elements may be removed, or otherwise consolidated such that a single processor and a single memory location are responsible for certain activities. Alternatively, certain processing functions could be separated and separate processors and/or physical machines could implement various functionalities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of the example embodiments, one or more memory elements (e.g., main memory 133, secondary storage 134, computer-readable medium 139) can store data used in implementing embodiments described and illustrated herein. This includes at least some of the memory elements being able to store instructions (e.g., software, logic, code, etc.) that are executed to carry out the activities described in this Specification. A processor can execute any type of instructions associated with the data to achieve the operations detailed herein in this Specification. In one example, one or more processors (e.g., processor 132) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable read only memory ("EEPROM")), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Components of communications network described herein may keep information in any suitable type of memory (e.g., random access memory ("RAM"), read-only memory ("ROM"), erasable programmable ROM ("EPROM"), electrically erasable programmable ROM ("EEPROM"), etc.), software, hardware, or in any other suitable component, device, element, or object where appropriate and based on particular needs. Any of the memory items discussed herein should be construed as being encompassed within the broad term "memory element." The information being read, used, tracked, sent, transmitted, communicated, or received by network environment, could be provided in any database, register, queue, table, cache, control list, or other storage structure, all of which can be referenced at any suitable timeframe. Any such storage options may be included within the broad term "memory element" as used herein. Similarly, any of the potential processing elements and modules described in this Specification should be construed as being encompassed within the broad term "processor."

Certain embodiments described herein separate the overlay in service function chaining into an infrastructure overlay and a service function overlay, allowing additional security policies to be enforced between the two. Certain embodiments described herein provide a stateless, hardware friendly method for decrementing the NSH service index without requiring any state at the forwarding element or sender awareness. Additionally, certain embodiments described herein restrict the forwarding decisions (in updating the service index) to the forwarding elements alone and frees the service functions to focus purely on service delivery and avoid dealing with complexities associated with forwarding decisions. Still further, certain embodiments described herein enable the service chaining control plane to scale independently of the number of service functions and prevent issues that may arise due to incorrect manipulation of the service index by limiting manipulation of the service index to forwarding elements.

Certain embodiments described herein allow snooping tools or any type of intermediate nodes to clearly determine whether the NSH encapsulated packet is going between forwarding elements or between a forwarding element and a service function without relying on the source and destination locators, which is useful in tracing and debugging, especially in cloud deployments. Certain embodiments described herein allow the service index on an NSH packet to be always associated with the service function as indicated by the service index whether the packet is in transit from a forwarding element to the service function or from the service function to a forwarding element.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that topologies illustrated in and described with reference to the accompanying FIGURES (and their teachings) are readily scalable and can accommodate a large number of components, as well as more complicated/sophisticated arrangements and configurations. Accordingly, the examples provided should not limit the scope or inhibit the broad teachings of the illustrated topologies as potentially applied to myriad other architectures.

It is also important to note that the steps in the preceding flow diagrams illustrate only some of the possible signaling scenarios and patterns that may be executed by, or within, communication systems shown in the FIGURES. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems shown in the FIGURES in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, embodiments described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 142 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   receiving at a network element an encapsulated packet;
   determining whether both an Equal Cost Multi-Path/Link Aggregation Group (ECMP/LAG) Existing ("ele") flag and an Entropy Label Capability ("elc") flag are set for an egress node of the encapsulated packet in a Label Distribution Protocol ("LDP") database of the network element;
   if both the ele and elc flags are set for the egress node of the encapsulated packet in the LDP database, determining whether the network element is an ingress node for the encapsulated packet; and
   if the network element is the ingress node for the encapsulated packet, pushing an Entropy Label ("EL") and an Entropy Label Indicator ("ELI") onto an Multiprotocol Label Switching (MPLS) stack of the encapsulated packet.

2. The method of claim 1 further comprising:
   if at least one of the ele flag and the elc flag is not set for the egress node of the encapsulated packet in the LDP database, determining whether the MPLS stack of the encapsulated packet includes the EL and the ELI; and
   if the MPLS stack of the encapsulated packet includes the EL and the ELI, popping the EL and the ELI from the MPLS stack of the encapsulated packet.

3. The method of claim 1 further comprising forwarding the encapsulated packet to a next hop node.

4. The method of claim 1, wherein if the egress node of the encapsulated packet is not EL capable, the ele flag is not set for the egress node of the encapsulated packet in the LDP database.

5. The method of claim 1, wherein if the egress node of the encapsulated packet is EL capable and Equal Cost Multi-Path ("ECMP") or Link Aggregation Group ("LAG") technology is deployed between the network element and a next hop node, the ele flag is set for the egress node of the encapsulated packet in the LDP database.

6. The method of claim 1, wherein if the egress node of the encapsulated packet is EL capable and at least one of a plurality of next hops between the network element and the egress node of the encapsulated packet has the ele flag set, the ele flag is set for the egress node of the encapsulated packet in the LDP database.

7. The method of claim 1, wherein the network element is a Multiprotocol Label Switching ("MPLS") router.

8. One or more non-transitory tangible media having encoded thereon logic that includes code for execution and when executed by a processor is operable to perform operations comprising:
   receiving at a network element an encapsulated packet;
   determining whether both an Equal Cost Multi-Path/Link Aggregation Group (ECMP/LAG) Existing ("ele") flag and an Entropy Label Capability ("elc") flag are set for an egress node of the encapsulated packet in a Label Distribution Protocol ("LDP") database of the network element;
   if both the ele and elc flags are set for the egress node of the encapsulated packet in the LDP database, determining whether the network element is an ingress node for the encapsulated packet; and
   if the network element is the ingress node for the encapsulated packet, pushing an Entropy Label ("EL") and an Entropy Label Indicator ("ELI") onto an Multiprotocol Label Switching (MPLS) stack of the encapsulated packet.

9. The media of claim 8, wherein the operations further comprise:
if at least one of the ele flag and the elc flag is not set for the egress node of the encapsulated packet in the LDP database, determining whether the MPLS stack of the encapsulated packet includes the EL and the ELI; and
if the MPLS stack of the encapsulated packet includes the EL and the ELI, popping the EL and the ELI from the MPLS stack of the encapsulated packet.

10. The media of claim 8, wherein the operations further comprise forwarding the encapsulated packet to a next hop node.

11. The media of claim 8, wherein if the egress node of the encapsulated packet is not EL capable, the ele flag is not set for the egress node of the encapsulated packet in the LDP database.

12. The media of claim 8, wherein if the egress node of the encapsulated packet is EL capable and Equal Cost Multi-Path ("ECMP") or Link Aggregation Group ("LAG") technology is deployed between the network element and a next hop node, the ele flag is set for the egress node of the encapsulated packet in the LDP database.

13. The media of claim 8, wherein if the egress node of the encapsulated packet is EL capable and at least one of a plurality of next hops between the network element and the egress node of the encapsulated packet has the ele flag set, the ele flag is set for the egress node of the encapsulated packet in the LDP database.

14. An apparatus comprising:
a memory element configured to store data;
a processor operable to execute instructions associated with the data; and
an Entropy Label ("EL") module configured to:
receive at a network element an encapsulated packet;
determine whether both an Equal Cost Multi-Path/Link Aggregation Group (ECMP/LAG) Existing ("ele") flag and an Entropy Label Capability ("elc") flag are set for an egress node of the encapsulated packet in a Label Distribution Protocol ("LDP") database of the network element;
if both the ele and elc flags are set for the egress node of the encapsulated packet in the LDP database, determine whether the network element is an ingress node for the encapsulated packet; and
if the network element is the ingress node for the encapsulated packet, push an EL and an Entropy Label Indicator ("ELI") onto an Multiprotocol Label Switching (MPLS) stack of the encapsulated packet.

15. The apparatus of claim 14, wherein the EL module is further configured to:
if at least one of the ele flag and the elc flag is not set for the egress node of the encapsulated packet in the LDP database, determine whether the MPLS stack of the encapsulated packet includes the EL and the ELI; and
if the MPLS stack of the encapsulated packet includes the EL and the ELI, pop the EL and the ELI from the MPLS stack of the encapsulated packet.

16. The apparatus of claim 14, wherein the EL module is further configured to forward the encapsulated packet to a next hop node.

17. The apparatus of claim 14, wherein if the egress node of the encapsulated packet is not EL capable, the ele flag is not set for the egress node of the encapsulated packet in the LDP database.

18. The apparatus of claim 14, wherein if the egress node of the encapsulated packet is EL capable and Equal Cost Multi-Path ("ECMP") or Link Aggregation Group ("LAG") technology is deployed between the network element and a next hop node, the ele flag is set for the egress node of the encapsulated packet in the LDP database.

19. The apparatus of claim 14, wherein if the egress node of the encapsulated packet is EL capable and at least one of a plurality of next hops between the network element and the egress node of the encapsulated packet has the ele flag set, the ele flag is set for the egress node of the encapsulated packet in the LDP database.

20. The apparatus of claim 14, wherein the network element is a Multiprotocol Label Switching ("MPLS") router.

* * * * *